United States Patent
Hu et al.

(10) Patent No.: US 11,380,882 B2
(45) Date of Patent: Jul. 5, 2022

(54) CARBONATE PRECURSORS FOR LITHIUM NICKEL MANGANESE COBALT OXIDE CATHODE MATERIAL AND THE METHOD OF MAKING SAME

(71) Applicants: Umicore, Brussels (BE); Umicore Korea LTD, Chungnam (KR)

(72) Inventors: Jin Hu, Antwerp (BE); HeonPyo Hong, Chungcheongnam-do (KR); Jens Paulsen, Daejeon (KR); JinDoo Oh, Chungcheongnam-do (KR); Daniël Nelis, Peer (BE); Eric Robert, Liège (BE)

(73) Assignees: UMICORE, Brussels (BE); UMICORE KOREA LTD., Chungnam (KR)

( * ) Notice: Subject to any disclaimer, the term of this patent is extended or adjusted under 35 U.S.C. 154(b) by 79 days.

(21) Appl. No.: 15/517,276

(22) PCT Filed: Sep. 30, 2015

(86) PCT No.: PCT/IB2015/057491
§ 371 (c)(1),
(2) Date: Apr. 6, 2017

(87) PCT Pub. No.: WO2016/055910
PCT Pub. Date: Apr. 14, 2016

(65) Prior Publication Data
US 2017/0309894 A1    Oct. 26, 2017

(30) Foreign Application Priority Data

Oct. 8, 2014   (EP) .................................... 14188028
Apr. 21, 2015  (EP) .................................... 15164468

(51) Int. Cl.
*H01M 4/1391* (2010.01)
*H01M 4/04* (2006.01)
(Continued)

(52) U.S. Cl.
CPC ........ *H01M 4/1391* (2013.01); *C01G 53/006* (2013.01); *C01G 53/44* (2013.01);
(Continued)

(58) Field of Classification Search
CPC .. H01M 4/1391; H01M 10/052; H01M 4/525; H01M 4/505; H01M 4/485; C01G 53/44; C01G 53/006; Y02T 10/7011
See application file for complete search history.

(56) References Cited

U.S. PATENT DOCUMENTS 7,767,189 B2      8/2010   Liu et al.
2005/0053545 A1*  3/2005   Liu ..................... H01M 4/1391
                                                    423/594.15
(Continued)

FOREIGN PATENT DOCUMENTS

CN      1708867       12/2005
CN      103708561 A    4/2014
(Continued)

OTHER PUBLICATIONS

"Growth Mechanism of Ni0.3Mn0.7CO3 precursor for high capacity Li-ion battery cathodes", J. Mater. Chem. (2011), vol. 21, p. 9290-9295 (Year: 2011).*
(Continued)

*Primary Examiner* — Maria Laios
(74) *Attorney, Agent, or Firm* — NK Patent Law (57) ABSTRACT

A method for producing a M-carbonate precursor of a Li-M oxide cathode material in a continuous reactor, wherein M=Ni$_x$Mn$_y$Co$_z$A$_n$, A being a dopant, with x>0, y>0, 0≤z≤0.35, 0≤n≤0.02 and x+y+z+n=1, the method compris-
(Continued)

ing the steps of: —providing a feed solution comprising Ni-, Mn-, Co- and A-ions, and having a molar metal content M" feed, —providing an ionic solution comprising either one or both of a carbonate and a bicarbonate solution, the ionic solution further comprising either one or both of Na- and K-ions, —providing a slurry comprising seeds comprising M'-ions and having a molar metal content M' seeds, wherein M'=Ni$x'$Mn$y'$Co$z'$A'$n'$, A' being a dopant, with $0 \leq x' \leq 1$, $0 \leq y' \leq 1$, $0 \leq z' \leq 1$, $0 \leq n' \leq 1$ and $x'+y'+z'+n'=1$, and wherein the molar ratio M' seeds/M" feed is between 0.001 and 0.1, —mixing the feed solution, the ionic solution and the slurry in the reactor, thereby obtaining a reactive liquid mixture, —precipitating a carbonate onto the seeds in the reactive liquid mixture, thereby obtaining a reacted liquid mixture and the M-carbonate precursor, and —separating the M-carbonate precursor from the reacted liquid mixture.

15 Claims, 4 Drawing Sheets

(51) Int. Cl.
  *H01M 4/505* (2010.01)
  *H01M 4/525* (2010.01)
  *C01G 53/00* (2006.01)
  *H01M 4/485* (2010.01)
  *H01M 10/052* (2010.01)

(52) U.S. Cl.
  CPC ......... *H01M 4/0471* (2013.01); *H01M 4/505* (2013.01); *H01M 4/525* (2013.01); *H01M 10/052* (2013.01); C01P 2002/52 (2013.01); C01P 2002/54 (2013.01); C01P 2002/72 (2013.01); C01P 2004/32 (2013.01); C01P 2004/51 (2013.01); C01P 2004/61 (2013.01); C01P 2006/11 (2013.01); C01P 2006/12 (2013.01); C01P 2006/40 (2013.01); *H01M 4/485* (2013.01); Y02T 10/70 (2013.01)

(56) References Cited

U.S. PATENT DOCUMENTS

| | | |
|---|---|---|
| 2006/0068289 A1 | 3/2006 | Paulsen |
| 2006/0073091 A1 | 4/2006 | Zou |
| 2006/0105239 A1 | 5/2006 | Paulsen |
| 2009/0068561 A1* | 3/2009 | Sun ........................ H01M 4/131 429/223 |
| 2011/0114900 A1 | 5/2011 | Nakaoka |
| 2012/0080649 A1* | 4/2012 | Koenig, Jr. .......... C01G 53/006 252/519.2 |
| 2013/0202502 A1 | 8/2013 | Schulz-Dobrick |
| 2015/0318538 A1* | 11/2015 | Sakai ................... C01G 53/006 429/223 |
| 2015/0364759 A1* | 12/2015 | Kase ...................... H01M 4/505 429/220 |

FOREIGN PATENT DOCUMENTS

| | | |
|---|---|---|
| JP | S59146943 A | 8/1984 |
| JP | H11240721 A | 9/1999 |
| JP | 2004-292264 | 10/2004 |
| JP | 2006-004724 | 1/2006 |
| JP | 2006503789 A | 2/2006 |
| JP | 2008535173 A | 8/2008 |
| JP | 2016153347 A | 8/2016 |
| JP | 2017536654 A | 12/2017 |
| KR | 20050083869 A | 8/2005 |
| KR | 10-2011-0073630 | 6/2011 |
| TW | 200738563 A | 10/2007 |
| WO | 2004/040677 | 5/2004 |
| WO | 2004040677 A1 | 5/2004 |
| WO | WO-2004040677 A1 * | 5/2004 ............ H01M 4/131 |
| WO | 2014012606 A1 | 1/2014 |

OTHER PUBLICATIONS

"Introduce | Definition of Introduce in English by Oxford Dictionaries." Oxford Dictionaries | English. Oxford Dictionaries, n.d. Web. Dec. 11, 2018. <https://en.oxforddictionaries.com/definition/introduce>. (Year: 2018).*
European search report for EP14188028, dated Mar. 19, 2015.
Taiwan Search Report for TW104132708, dated Apr. 13, 2016.
International search report for PCT/IB2015/057491, dated Jan. 20, 2016.
Wang, D., et al., "Growth Mechanism of Ni0.3Mn0.7CO3 Precursor for High Capacity Li-Ion Battery Cathodes", J. Mater. Chem. (2011), vol. 21, pp. 9290-9295.

* cited by examiner

CARBONATE PRECURSORS FOR LITHIUM NICKEL MANGANESE COBALT OXIDE CATHODE MATERIAL AND THE METHOD OF MAKING SAME

This application is a National Stage application of International Application No. PCT/IB2015/057491, filed Sep. 30, 2015. This application also claims priority under 35 U.S.C. § 119 to European Application No. 14188028.6, filed Oct. 8, 2014 and European Application No. 15164468.9, filed Apr. 21, 2015.

TECHNICAL FIELD AND BACKGROUND

The invention relates to a carbonate precursor material for a lithium nickel manganese cobalt oxide, to be used as a cathode material for Li-ion batteries, and a method for producing the carbonate precursor.

In present and future applications, Li batteries with high energy density are needed. A high energy density can be achieved by cathodes having either one or (preferably) both of a high volumetric density and a high specific reversible discharge capacity. For a long time, $LiCoO_2$ (or "LCO") was the dominating cathode material for rechargeable lithium batteries. LCO has a relatively high capacity (150-160 mAh/g when cycled at 3-4.3V) together with a high density (the true density is about 5.05 g/cm$^3$) and is relatively easy to produce. It has a relatively high Li diffusion, so it is possibly to utilize large and dense particles (10-20 μm size) with a small surface area (0.1-0.5 m$^2$/g). All in all, commercial LCO is a robust and easy to manufacture cathode powder.

LCO however also has serious drawbacks. A main drawback is the relative scarcity of Co resources related to the relatively high cost of cobalt metal. Still worse, historically the cobalt prize shows wild fluctuations, and these fluctuations possibly increased the need to find substitutes for $LiCoO_2$. The main substitute for LCO, which has emerged commercially within the past years, is lithium nickel manganese cobalt oxide (also referred to as "NMC"). This material belongs to the ternary phase diagram of $LiMnO_2$—$LiNiO_2$—$LiCoO_2$, with a general formula $Li_{(1+m)}(Ni_xMn_yCo_z)_{1-m}O_{2+\delta}$, with x+y+z=1, 0≤δ≤0.3, 0≤m≤0.5. The NMC has the advantages of lower cost, higher working voltage and Li-storage capacity than LCO, and has received increasing demands in the past few years. Additionally this composition can be modified by doping. It is known for example that elements like Al, Mg, Ti and sometimes Zr can partly replace Co, Ni or Mn. Within the complex ternary phase diagram there is a wide degree of freedom to prepare electrochemically active phases with different composition and quite different performance.

Generally, for the production of cathode materials with complex compositions, such as NMC cathode materials, special precursors such as mixed transition metal hydroxides are used. The reason is that high performance Li-M-$O_2$ needs well mixed transition metal cations. To achieve this without "oversintering" (which is high temperature sintering for a longer period with a typical Li-precursor such as $Li_2CO_3$) the cathode precursors need to contain the transition metal in a well-mixed form (at atomic level) as provided in mixed transition metal hydroxides. Mixed hydroxides are typically prepared by precipitation reactions, for example by the precipitation from a flow of M-$SO_4$ mixed with NaOH under controlled pH, allowing precursors of suitable morphology to be achieved. The NMC hydroxide raw material has the advantages of a low specific surface area and a relative high tap density (TD), and consequently, NMC obtained thereof also has a low specific surface area and relatively high TD. The high energy density of the Li-ion battery can be achieved by using such high TD cathode materials.

Recently, there is a demand for batteries that are excellent in rate performance and cycle life stability, to be used in electric vehicles (xEV) and power tools. By increasing the specific area of the positive electrode material demands for rapid charge and discharge of the battery (what is known as a good rate performance) can be coped with. Comparing nickel manganese cobalt hydroxide precursors with equivalent carbonate precursors, the latter have the advantage of a higher specific surface area and a spherical morphology providing a high tap density. However, the conventional carbonate precursor producing method is a precipitation method that has the disadvantage of being highly unstable. As a consequence, the particle size of the obtained carbonate precursor is fluctuating continuously during precipitation. It is also very difficult to tune the particle size of the carbonate precursor by changing the precipitation parameters during the precipitation process, which makes it not flexible for mass production purposes. The need for precipitation stability and particle size tunability is the main challenge for the carbonate precursor production process, and so far the practical application of carbonate precursors in NMC mass production is handicapped.

Methods using as starting raw material nickel manganese cobalt carbonate precursors have already been proposed, for example in US2011/0114900. In this patent, a method to produce a nickel manganese cobalt carbonate precursor with a high specific surface area and high tap density has been demonstrated by conducting a precipitation in a batch reactor, by adding a solution A that contains a nickel salt, a manganese salt, a cobalt salt; and a solution B that contains a metal carbonate or a metal bicarbonate; to a solution C that contains the same anion as the anions of the nickel salt, the manganese salt and the cobalt salt in solution A and the same anion as the anions of the metal carbonate or the metal bicarbonate in solution B.

In "Growth mechanism of $Ni_{0.3}Mn_{0.7}CO_3$ precursor for high capacity Li-ion battery cathodes", by Dapeng Wang et al., in J. Mater. Chem., 2011, 21, 9290-9295, nickel manganese cobalt carbonate precursors have been produced by pumping nickel-, manganese- and cobalt sulfates, sodium carbonate and an ammonium solution into a continuous stirred tank reactor (CSTR). However, the particle size cannot be controlled in the carbonate precipitation process described in this article. In addition, the ammonium solution is also used as a chelating agent during precipitation, with the disadvantage of creating environmental issues and increasing cost.

U.S. Pat. No. 7,767,189 discloses a method for preparing lithium transitional metal oxides using carbonate precursors, and comprising the steps of: preparing a carbonate precursor using the following sub steps: forming a first aqueous solution containing a mixture of at least two of the ions of the following metal elements ("$Me^{n+}$"): cobalt (Co), nickel (Ni), and manganese (Mn); forming a second aqueous solution containing ions of $CO_3^{2-}$; and mixing and reacting the first solution with the second solution to produce the carbonate precursor, $Ni_{1-x-y}Co_xMn_yCO_3$; and preparing the lithium transition metals oxide from the carbonate precursors using the following sub steps: evenly mixing $Li_2CO_3$ and the carbonate precursor; calcinating the mixed material in high temperature; and cooling and pulverizing the calcinated material to obtain the lithium transition metal oxide, $LiNi_{1-x-y}Co_xMn_yO_2$.

Typical carbonate precipitation processes involve the use of ammonia. The ammonia is a so-called chelating agent, which is practically important to stabilize the precipitation process. However, ammonia present in a precipitation process always creates a certain safety risk. In addition, after precipitation the ammonia remains in the filtered solution. The ammonia cannot be released to the environment. Therefore the waste water is treated to remove—preferably to recycle—the ammonia. These ammonia installations are expensive and increase significantly the capital investment, as well as the operating cost (energy) for the waste treatment. It would therefore be desired to devise an ammonia free precipitation method which supplies mixed precursors having a sufficient density and spherical morphology.

An object of the present invention is to provide a method to solve the precipitation stability and particle size tunability issues of the carbonate precipitation process without sacrificing the spherical morphology of the precipitate, in a continuous process, and to provide a carbonate precursor having a high specific surface area and a relatively high tap density—even when working without the use of a chelating agent—making them suitable in the production of cathode materials for the batteries of electric vehicles (xEV) and power tools.

SUMMARY

Viewed from a first aspect, the invention can provide a method for producing a M-carbonate precursor of a Li-M oxide cathode material in a continuous reactor, wherein $M=Ni_xMn_yCo_zA_n$, A being a dopant, with $x>0$, $y>0$, $0 \leq z \leq 0.35$, $0 \leq n \leq 0.02$ and $x+y+z+n=1$, the method comprising the steps of:
  providing a feed solution comprising Ni-, Mn-, Co- and A-ions, and having a molar metal content $M''_{feed}$,
  providing an ionic solution comprising either one or both of a carbonate and a bicarbonate solution, the ionic solution further comprising either one or both of Na- and K-ions,
  providing a slurry comprising seeds comprising M'-ions and having a molar metal content $M'_{seeds}$, wherein $M'=Ni_{x'}Mn_{y'}Co_{z'}A'_{n'}$, A' being a dopant, with $0 \leq x' \leq 1$, $0 \leq y' \leq 1$, $0 \leq z' \leq 1$, $0 \leq n' \leq 1$ and $x'+y'+z'+n'=1$, and wherein the molar ratio $M'_{seeds}/M''_{feed}$ is between 0.001 and 0.1,
  mixing the feed solution, the ionic solution and the slurry in the reactor, thereby obtaining a reactive liquid mixture,
  precipitating a carbonate onto the seeds in the reactive liquid mixture, thereby obtaining a reacted liquid mixture and the M-carbonate precursor, and
  separating the M-carbonate precursor from the reacted liquid mixture.

In one embodiment, the seeds have a median particle size D50 between 0.1 and 3 μm. In another embodiment the M'-ions are present in a water insoluble compound that is either one of $M'CO_3$, $M'(OH)_2$, M'-oxide and M'OOH. Examples of these are $MnCO_3$ and $TiO_2$. In still another embodiment, the Ni-, Mn-, Co- and A-ions are present in a water soluble sulfate compound. A and A' may be either one or more of Mg, Al, Ti, Zr, Ca, Ce, Cr, Nb, Sn, Zn and B. In an embodiment M=M'. The composition M may for example be Ni:Mn:Co=42:42:16; or Ni:Mn:Co=33:33:33; or Ni:Mn:Co=60:20:20; or Ni:Mn:Co=22:67:11. Hence in one embodiment $M=Ni_xMn_yCo_zA_n$, with $20 \leq x \leq 80$, $20 \leq y \leq 70$, $10 \leq z \leq 0.35$, $0 \leq n \leq 0.02$ and $x+y+z+n=1$. In that embodiment A may be Ti.

Figure 1:
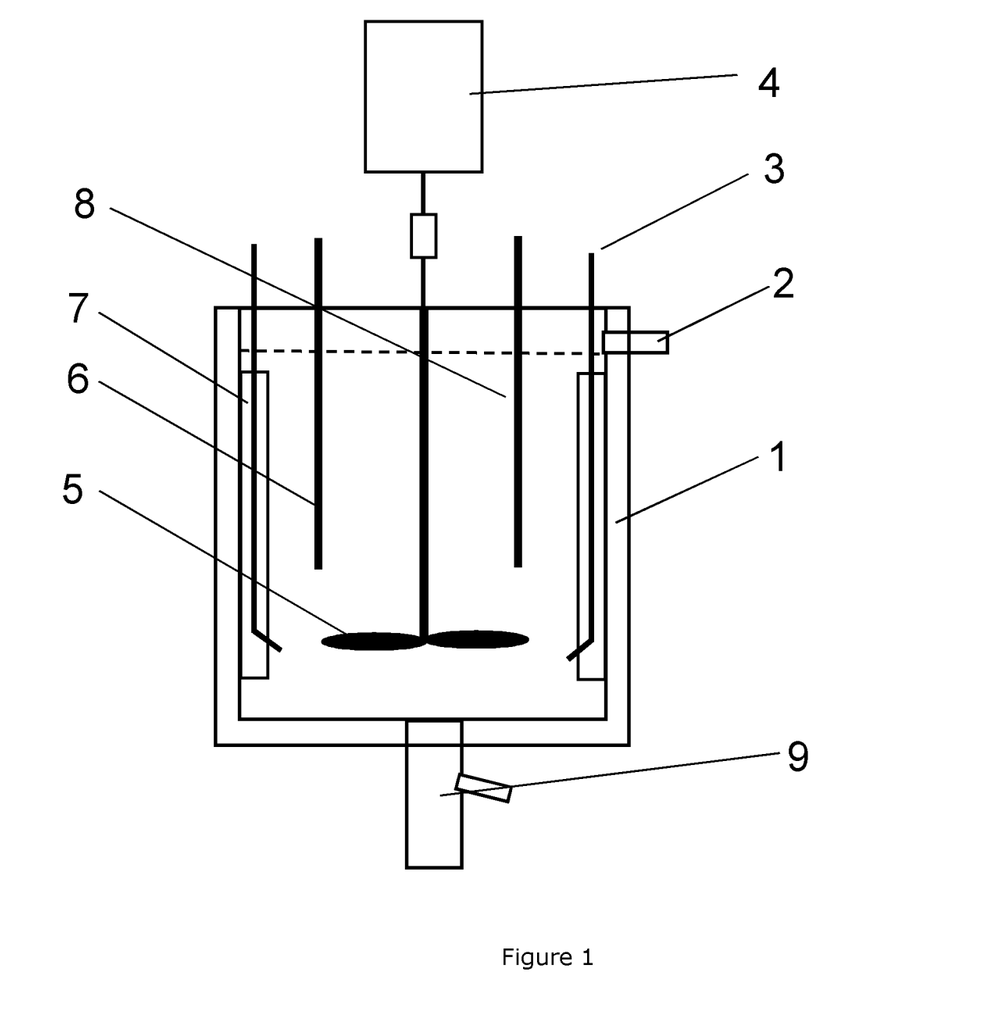
FIG. 1: design of a typical 10 L CSTR reactor.

In view of the above-described circumstances, the present inventors diligently conducted a great deal of study, and consequently, perfected the present invention by conducting a precipitation reaction by pumping a feed solution that contains a nickel salt, a manganese salt and a cobalt salt and a hydroxide solution that contains a metal carbonate or metal bicarbonate and a slurry of seeds into a CSTR reactor. The CSTR reactor is illustrated in FIG. 1. In the process according to the invention, there is no nucleation process taking place in the reactor and the M-carbonate precursor only grow on the surface of the seeds.

In a further method embodiment the molar ratio ($M'_{seeds}/M''_{feed}$) of the metal content in the seed slurry to the metal content in the feed solution is between 0.001 and 0.05. In the invention, it is possible to set the median particle size of the M-carbonate precursor by applying a certain ratio $M'_{seeds}/M''_{feed}$. In the embodiments, the solid content in the slurry may be between 30 and 300 g/L. In addition, the as described carbonate precipitation process in this invention can be operated under low ammonium concentration (eg. less than 5.0 g/L), or even without ammonium. The reactor may be a continuous stirred tank reactor (CSTR). It is clear that further method embodiments according to the invention may be provided by combining features that are covered in each of the different method embodiments described before.

An aspect of the present invention is the provision of a carbonate precursor, where the carbonate precursor contains Ni, Mn and Co atoms, and has a median particle size of 3-20 μm, a BET specific surface area of 10-200 m$^2$/g and a tap density of 1.0-2.0 g/cm$^3$. The carbonate precursor obtained by the method according to the invention thus has a high specific surface area and a controllable particle size; and so too has the NMC cathode material obtained by firing the carbonate precursor with a lithium precursor. A Li-ion battery that uses these NMC cathode materials exhibits excellent battery performances and is especially suitable for high power or high rate applications. One reason for this is that during the sintering process of the carbonate precursor with e.g. lithium carbonate, $CO_2$ is released from the carbonate precursor particles. The release of $CO_2$ from the core of the particles creates "chimneys" which ultimately result in an open porosity of the final cathode material. By applying a suitable firing profile the open porosity remains in the final cathode product.

Viewed from a second aspect, the invention can provide a method for producing a lithium M-oxide cathode material for a rechargeable battery, comprising the steps of:
  providing a M-carbonate precursor according to the first aspect of the invention,
  providing a Li precursor compound,
  mixing the M-carbonate and the Li precursor, and
  firing the mixture at a temperature between 600 and 1100° C. for at least 1 hr. The lithium precursor may for example be LiOH or $Li_2CO_3$.

It should be mentioned here that in WO2004/040677 describes a process for preparing powderous transition metal compounds, comprising at least one precipitation reaction, wherein at least one solution of dissolved transition metal salt and at least one solution of dissolved hydroxide of carbonate salts are added to particles acting as seeds; dissolved transition metal cations and dissolved hydroxide or carbonate anions form a solid precipitate; and the precipitate forms a layer covering the seed particles, the precipitate having a transition metal composition M2, which differs from the composition M1 of the seed particles by at least 10%. As it is the object to provide powderous materials which have a significantly different transition metal composition in the outer bulk and the inner bulk, in the examples, the total stoichiometric amount of precipitated $M(OH)_2$ or $MCO_3$ onto the seeds is between 11 and 25 mol %, meaning that the seeds represent a large part of the final precipitated product, and that the amount of seeds in the slurry needs to be very large to achieve this. This results in a $M'_{seeds}/M''_{feed}$ ratio between 4 and 9.09, orders of magnitude than in the present invention.

In the present invention, our objective is using seeds to stabilize the precipitation process. It has been found that the quantity of seeds should be limited (which is expressed by $M'_{seeds}/M''_{feed} \leq 0.1$) and should represent only a very small molar amount of the precipitated product, as the increase of the amount of seeds leads to the formation of large amounts of fine particles and lowering of the tap density of the precipitated carbonate precursor, whereby the following problems occur in the final lithiated product:

an inacceptable large span, as the span of the precipitated carbonate corresponds largely to the span of the sintered lithiated product made with that carbonate (the span being the value of (D90-D10)/D50 of the volumetric particle size distribution, where the D50 (μm) refers to the median particle size; D90 (μm) refers to the particle size where 90% of the distribution lies below; and D10 (μm) refers to the particle size where 10% of the distribution lies below), problems of brittleness, the excess quantity of fines causing safety problems in the Li-ion battery, and the lower tap density of the precursor yielding a lower tap density of the final product with a decrease of energy density in the battery as a consequence.

DETAILED DESCRIPTION

In an embodiment of the invention, the carbonate precursor of the present invention is a composite carbonate that contains Ni, Co and Mn atoms, has a general formula of $(Ni_xMn_yCo_zA_n)CO_3$, with $x+y+z+n=1$, $0 \leq x \leq 1$, $0 \leq y \leq 1$, $0 \leq z \leq 0.35$, $0 \leq n \leq 0.02$, A being one or more dopants selected from Mg, Al, Ti, Zr, Ca, Ce, Cr, Nb, Sn, Zn and B. The obtained carbonate precursor has a specific surface area larger than 10 m²/g. The specific surface area is measured by a standard Brunauer-Emmett-Teller (BET) method and carried out on a Quantachrome® Autosorb instrument. Before the BET measurement, the sample is degassed at 200° C. for 6 hours, to get ride of the moisture completely. The particle size of the carbonate precursor is measured with a Malvern® MasterSizer2000. The tap density (TD) measurement of the carbonate precursor in this invention is carried out by mechanically tapping a graduated measuring cylinder (100 ml) containing the precursor sample (having a mass W, around 60-120 g). After observing the initial powder volume, the measuring cylinder is mechanically tapped for 400 times, so that no further volume (V in cm³) or mass (W) change is observed. The TD is calculated as TD=W/V. The TD measurement is carried out on an ERWEKA® instrument.

Next, a method for producing a carbonate precursor according to the present invention is described. The composite carbonate may be obtained by conducting a co-precipitation reaction in a continuous stirred tank reactor (CSTR), by pumping into the reactor a feed solution that contains a Ni salt, a Mn salt and a Co salt and optionally an A salt, a carbonate solution that contains a metal carbonate or a metal bicarbonate, a seed slurry that contains either one of $M'CO_3$, $M'(OH)_2$, $M'$-oxide or $M'OOH$ small particles ($M'=Ni_{x'}Mn_{y'}Co_{z'}A'_{n'}$, $x'+y'+z'+n'=1$, $0 \leq x' \leq 1$, $0 \leq y' \leq 1$, $0 \leq z' \leq 1$ and $0 \leq n' \leq 1$), and optionally a hydroxide solution that contains a metal hydroxide. The composition of M' is not necessary the same as that of M in this invention. A' is a dopant that may comprise one or more metals, such as Mg, Al, Ti and Zr. A' may be equal to A, but may also be different if A is composed of more than one metal. For example if A is a TiMg composition, then A' may be either Mg, Ti or a MgTi composition, the latter may have the same composition as A but may also have a different composition.

The feed solution contains a Ni salt, a Mn salt and a Co salt, and optionally an A salt. The kind of Ni salt in the feed solution is not particularly limited, as long as the Ni salt is water-soluble to yield a Ni ion-containing aqueous solution; examples of Ni salts include sulfate salt, chloride salt, nitrate salt and acetate salt of Ni. Also, the kind of Mn salt in the feed solution is not particularly limited, as long as the Mn salt is water-soluble to yield a Mn ion-containing aqueous solution; examples of Mn salts include sulfate salt, chloride salt, nitrate salt and acetate salt of Mn. Similarly, the kind of Co salt in the feed solution is not particularly limited, as long as the Co salt is water-soluble to yield a Co ion-containing aqueous solution; examples of Co salts include sulfate salt, chloride salt, nitrate salt and acetate salt of Co.

In the carbonate precursor of the present invention, A is a cation dopant different from Ni, Mn and Co, which may be one or more of Mg, Al, Ti, Zr, Ca, Ce, Cr, Nb, Sn, Zn and B. For cation doping (A element), the doping element is dissolved in the feed solution. The corresponding dopant salt in the feed solution is not particularly limited; as long as it is water-soluble to yield a dopant ion-containing aqueous solution; examples of dopant salts include sulfate salt, chloride salt, nitrate salt and acetate salt. The concentration of the dopant salt in the feed solution is determined by its desired content in the final carbonate precursor, and its (optional) presence in the seed slurry.

In the aqueous feed solution, the content of Ni ions expressed in Ni atoms is preferably 0.1 to 2.0 mol/L and particularly preferably 0.2 to 1.8 mol/L, the content of Mn ions expressed in Mn atoms is preferably 0.1 to 2.0 mol/L and particularly preferably 0.2 to 1.8 mol/L, the content of Co ions expressed in Co atoms is preferably 0.05 to 1.5 mol/L and particularly preferably 0.1 to 1.0 mol/L. The concentration of the Ni ions, Mn ions and Co ion in the feed solution respectively falling within the above described ranges enables to get a balance between the product yield and the physiochemical properties of the obtained carbonate precursor. The total concentration of the anions of Ni, Mn and Co in the feed solution is preferably 1.0 to 3.0 mol/L and particularly preferably 1.5 to 2.5 mol/L. The molar ratios in the feed solution between Ni, Mn and Co atom concentrations falling within the above-described ranges further enhance the electrochemical performance of the final lithium metal oxide.

The aqueous carbonate solution contains any one or both of a metal carbonate and a metal bicarbonate. The carbonate solution is not particularly limited as long as the metal carbonate is water-soluble to yield a carbonate ion contained aqueous solution; examples of the metal carbonate include: alkaline metal carbonate such as sodium carbonate and potassium carbonate. The bicarbonate solution is not particular limited as long as it is water-soluble to yield a bicarbonate ion contained aqueous solution; examples of the metal bicarbonate include: alkaline metal bicarbonate such as sodium bicarbonate and potassium bicarbonate. Preferably the carbonate solution contains the cheap sodium carbonate, rendering the pH of the reaction solution nearly neutral. In the carbonate solution, the concentration of carbonate or bicarbonate ions is preferably 1.0-4.0 mol/L and particularly preferably 1.5-3.0 mol/L. The concentration of the carbonate or bicarbonate ions falling in that range enables to produce good precursor and a final oxide with excellent electrochemical performances.

The use of a hydroxide solution is an option in the carbonate precipitation process of this invention. Generally speaking, $Na_2CO_3$ replaced by a small percentage of NaOH (eg. 0-5 wt %) can further increase the specific surface area of the obtained carbonate precursor, which will benefit the rate performance of the final NMC cathode material. It may be a metal hydroxide aqueous solution. The hydroxide solution is not particularly limited as long as the metal hydroxide is water-soluble to yield a caustic ion containing aqueous solution; examples of the metal hydroxide include: an alkaline metal hydroxide such as lithium, sodium and potassium hydroxide. Preferred among these are lithium hydroxide and sodium hydroxide, rendering the pH of the reaction solution nearly neutral, whilst both are also relatively cheap. In the hydroxide solution, the concentration of hydroxide ions is preferably 5-15 mol/L and particularly preferable 8-10 mol/L. The concentration of the hydroxide ions in that range enables to produce a good precursor and a final oxide with excellent electrochemical performances.

The seeds of the present invention may be small particles of $M'CO_3$, $M'(OH)_2$, M'-oxide or M'OOH ($M'=Ni_{x'}Mn_{y'}Co_{z'}A'_{n'}$, $x'+y'+z'+n'=1$, $0 \leq x' \leq 1$, $0 \leq y' \leq 1$, $0 \leq z' \leq 1$ and $0 \leq n' \leq 1$, M' can thus be a single metal, bimetal, ternary metal, or even quaternary metal composition). The seeds can be commercial products of $M'CO_3$, $M'(OH)_2$, M'-oxide or M'OOH with small particle size, with a D50 of 0.1-2 μm. The seeds can also be produced by milling of $M'CO_3$, $M'(OH)_2$, M'-oxide and M'OOH big particles and decrease its particle size to 0.1-2 μm for D50. The milling technology includes jet mill, ball mill, beads mill or ring mill etc.; with or without a dispersion agent. Then, the obtained small particles are re-dispersed in water to form a homogeneous seed slurry. The solid loading of the seed slurry is preferably in the range of 30-300 g/L, and particularly preferably in the range of 50-200 g/L. It should be emphasized here that the composition of M' is not necessarily the same as that of M in this invention. In the embodiment where M=M, a quantity of final product $MCO_3$ is transformed into seed material. It is evident that the seeds used in this invention are water insoluble.

In one embodiment, the carbonate precursor of the present invention is produced in a continuously stirred tank reactor (CSTR, such as described in http://encyclopedia.che.en-qin.umich.edu/Paaes/Reactors/CSTR/CSTR.html) under a certain temperature, pH value and stirring speed. A typical structure and design of a 10 L CSTR reactor is shown in FIG. 1, with a diameter of 200 mm and height of 420 mm. Four baffles are installed in the reactor and a pitched-blade impeller is equipped on ⅓ of the height from the bottom. The dosing tubes are fixed on the baffles at the same height of the impeller. The stirring speed of the impeller is controlled by a motor above the CSTR reactor.

Legend for FIG. 1:

| 1 | Water jacket | 2 | Overflow |
|---|---|---|---|
| 3 | Dosing tube | 4 | Motor |
| 5 | Impeller | 6 | pH senor |
| 7 | Baffle | 8 | Temperature sensor |
| 9 | Outlet valve | | |

In the method for producing a carbonate precursor of the present invention, the different solutions and the seed slurry may be simultaneously or alternately pumped into the reactor; while its content is being maintained at 30 to 95° C., and preferably at 50 to 90° C. The solutions and seed slurry are pumped into a CSTR reactor with a certain flow rate, e.g. $R_{feed}$, $R_{carbonate}$, $R_{hydroxide}$ and $R_{seeds}$, corresponding to the flow rate of feed solution, carbonate solution, hydroxide solution and seed slurry, respectively. The residence time Re is calculated by dividing the volume of the CSTR reactor (V) by the flow rate sum of the feed, carbonate, hydroxide solution and seed slurry; $Re=V/(R_{feed}+R_{carbonate}+R_{hydroxide}+R_{seeds})$. The residence time Re can thus be tuned by adapting the flow rate of feed, carbonate and hydroxide solutions, and the flow rate of the seed slurry. The residence time Re of the present invention is set in the range of 1.5-6.0 hours, and preferably in the range of 2.0 to 4.0 hours. The reaction temperature T is set in the range of 30 to 95° C., and preferably at 50 to 90° C. The stirring speed in the CSTR reactor is set in the range of 500-2000 rpm, and preferably in the range of 800-1500 rpm.

The amount of the feed and carbonate solution added into the reactor is such that the molar ratio ($CO_3/M$) of the total number of the carbonate ions to the total number of moles (M) of Ni, Mn, Co and A ions added from the feed solution is preferably 0.9 to 1.2, and particularly preferably 0.95 to 1.15. The ratio ($HCO_3/M$) of the total number of the moles ($HCO_3$) present in bicarbonate ions in the reaction to the total number of moles (M) of Ni, Mn and Co ions added from the feed solution is preferably 1.9 to 2.4, and particularly preferably 1.9 to 2.3. The amount of the seeds added into the reactor is such that the molar ratio ($M'_{seeds}/M''_{feed}$) of the total number of moles ($M'_{seeds}$) of Ni, Mn, Co and A ions added in the seed slurry to the total number of moles ($M''_{feed}$) of Ni, Mn, Co and A ions added from the feed solution is preferably 0.001 to 0.1, and particularly preferably 0.001 to 0.05. When a hydroxide solution is added, the amount of the carbonate/bicarbonate solution and hydroxide solution are such that the ratio $OH/CO_3$ of the total number of moles OH added in the hydroxide solution to the total number of the moles $CO_3$ present in the carbonate ion or bicarbonate ions in the reaction is preferably less than 0.1, and particularly preferably less than 0.05. Similarly, $OH/HCO_3$ is preferably less than 0.1, and particularly preferably less than 0.05.

The carbonate precipitation process is mainly controlled by the following parameters:
Stirring speed of impeller
Temperature
Residence time
pH
Metal M concentration
$CO_3$/M molar ratio
$OH/CO_3$ or $OH/HCO_3$ molar ratio
$M'_{seeds}/M''_{feed}$ molar ratio.

The carbonate precursors according to the invention can be produced by tuning these parameters in the ranges as described above.

Figure 2:
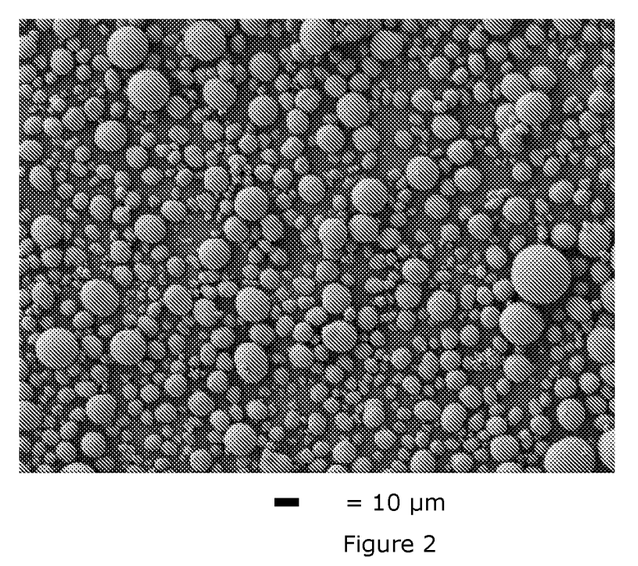
FIG. 2: SEM images (500× magnification) of the carbonate precursor in Example 1
Figure 3:
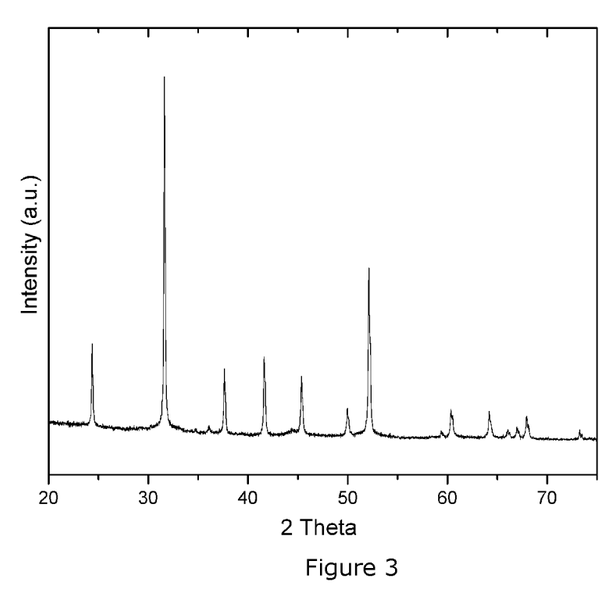
FIG. 3: XRD pattern of the carbonate precursor in Example 1

The carbonate precursor slurry is collected from the overflow of a CSTR reactor and the precursor particles are obtained by a solid-liquid separation process, for example, press filtration or continuous centrifugal filtration. The solid-liquid separation process is considered to be finished when the conductivity of the filter/centrifuge waste water is lower than 20 μS/m. The thus obtained particles are dried at 150° C., pulverized and classified to yield the carbonate precursor of the present invention. The typical scan electron microscopy (SEM) images and XRD pattern of the as-prepared carbonated precursor are shown in FIG. 2 and FIG. 3, respectively. FIG. 2 shows the typical spherical morphology obtained by the method of the invention.

The (doped) lithium nickel manganese cobalt oxide (NMC(A)) represented by the above-described general formula is produced by mixing the (bi-)carbonate precursor of the present invention with a lithium compound and by sintering the thus obtained mixture. The amount of the lithium compounds added is such that the ratio (Li/M) of the number of moles of the lithium atoms in the lithium compound to the total number of moles (M) of the Ni, Mn, Co and A atoms included in the carbonate precursor is preferably 0.95-1.60, and more preferably 1.00-1.50. The sintering atmosphere is not particularly limited; the sintering may be conducted under air or in an oxygen atmosphere, for example as a multiple stage sintering. The sintering conditions are such that the baking temperature is 600-1100° C., preferably 850 to 1000° C., and the sintering time is 5 hours or more, preferably 10 to 24 hours. After sintering, by appropriately cooling and by pulverizing and classifying where necessary, there can be obtained a (doped) lithium nickel manganese cobalt oxide (NMC(A)) having a BET specific surface area up to 1 $m^2$/g or more and a tap density up to 1.2 $g/cm^3$ or more. Such a NMC(A) material is suitable for using as a cathode material in a high rate Li-ion battery for xEV applications.

The invention is further illustrated in the following examples:

Comparative Example 1

Figure 4:
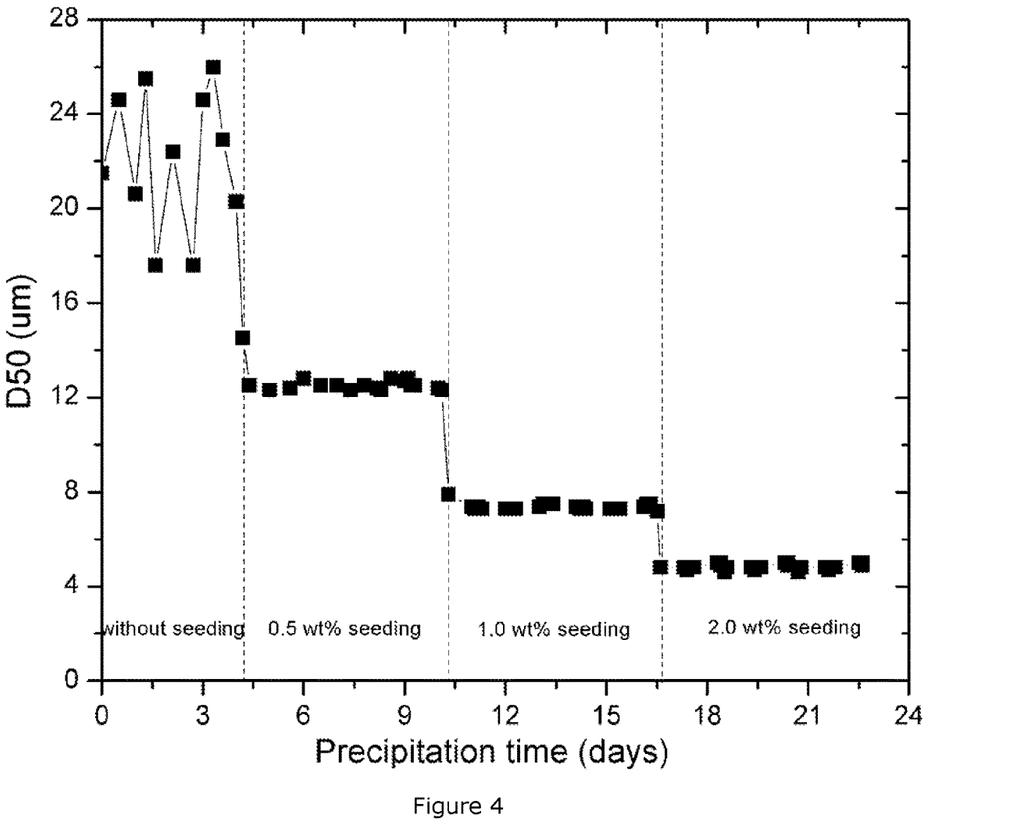
FIG. 4: The average particle size (D50) variation before (Comparative Example 1) and after 0.5 wt %, 1.0 wt % and 2 wt % of seeding (Example 1).

Preparation of feed solution: $NiSO_4$, $MnSO_4$, $CoSO_4$ and $MgSO_4$ are dissolved in deionized water and a transition metal solution is prepared, with a concentration of Ni, Mn, Co and Mg of 0.835 mol/L, 0.835 mol/L, 0.32 mol/L and 0.01 mol/L (Ni:Mn:Co:Mg=41.75:41.75:16:0.5), respectively. For preparing the carbonate solution, $Na_2CO_3$ is dissolved in deionized water and a 1.65 mol/L $Na_2CO_3$ solution is obtained. The feed and carbonate solution are pumped into a 10 L CSTR reactor. The molar ratio of $CO_3$:Metal=1.0 and the residence time is set at 3 hours. The feed solution and carbonate solution are continuously pumped into the CSTR reactor set at a precipitation temperature of 90° C., with an impeller stirring speed at 1000 rpm. The obtained carbonate precursor has a value for TD and D50 of 1.7 $g/cm^3$ and 23.5 μm, respectively. This precursor has a BET value of 132 $m^2$/g. But the carbonate precipitation process without seeding is unstable and the average particle size (D50) varies continuously during precipitation, which is shown in FIG. 4—left part.

Example 1

The same precipitation conditions as in Comparative Example 1 are used, but with seeding. For preparing the seed slurry, the seeds are re-dispersed into water to form a homogeneous slurry under stirring with a 200 g/L solid load level. The seeds are prepared by bead milling the big carbonate particles which are produced from the carbonate process without seeding of Comp. Ex. 1 (and hence M=M'), to decrease the median particle size (D50) to 1.0 μm.

The feed, carbonate solution and the seed slurry are pumped into the 10 L CSTR reactor. The molar ratio of $CO_3$:Metal=1.0 and the molar ratio of $M'_{seeds}/M''_{feed}$ is set at 0.005 (0.5 wt %), 0.01 (1.0 wt %) and 0.02 (2.0 wt %) consecutively, and the residence time is set at 3 hours. The feed solution, carbonate solution and seed slurry are continuously pumped into the CSTR reactor set at a precipitation temperature of 90° C., with an impeller stirring speed at 1000 rpm. The carbonate precursor slurry is collected through the overflow of the reactor. Then, the obtained precursor slurry is solid-liquid separated by a press filter, and washed with deionized water for several times until the conductivity of the filter water is lower than 20 μS/m. The thus obtained carbonate precursor wet cake is dried in an oven at 150° C. for 24 hours. The final obtained carbonate precursor has a composition of $(Ni_{0.415}Mn_{0.415}Co_{0.16}Mg_{0.005})CO_3$. The TD, D50 and BET of these products are compared in Table 1 as shown below.

TABLE 1

Comparison of TD, D50 and BET for precursors obtained in Comparative Example 1 and Example 1.

| Example | Seeding wt % | D50 (μm) | TD ($g/cm^3$) | BET ($m^2$/g) | Particle size tunability | Morphology |
|---|---|---|---|---|---|---|
| Comparative Example 1 | No | 22.8 | 1.56 | 132 | No | Spherical |
| Example 1 | 0.5 | 12.5 | 1.30 | 141 | Yes | Spherical |
| Example 1 | 1.0 | 7.4 | 1.21 | 151 | Yes | Spherical |
| Example 1 | 2.0 | 4.8 | 1.04 | 206 | Yes | Spherical |

FIG. 4 represents in the left part the situation of Comp. Ex.1, and with seeding starting after 4 days, the precipitation process is effectively stabilized and the particle size can be finely tuned by changing the weight ratio of the seed slurry, resulting in the situation shown to the right, corresponding to the data of Example 1.

Generally speaking, because a very low concentration (≤5 g/L) of a chelating agent (eg. $NH_4OH$), or even no chelating agent is used in this invention, the nucleation speed is very fast for a typical carbonate precipitation process in a CSTR reactor. This is the reason why the carbon precipitation process is unstable, if seeding is not applied. After small seeds are added into the reactor, in principle, there is no nucleation process taking place in the reactor and the new metal carbonates will only grow on the surface of the seeds as a consequence. Because the carbonate precipitation will only be carried out on the surface of seeds, in principle, the particle size in the reactor after seeding is determined by the molar ratio between $M'_{seeds}/M''_{feed}$, and the quantity and size of the seeds that are added in the reactor. This is the mechanism permitting the seeding process to stabilize the carbonate precipitation process, and also enabling that the particle size after seeding can be tuned, i.e. by changing the quantity of seeds. For example, the particle size can be decreased by increasing the molar ratio $M'_{seeds}/M''_{feed}$. Because more seeds are added in the reactor, this results in less carbonate grow on each seed, and the particle size will decrease as a consequence. However, when increasing the ratio $M'_{seeds}/M''_{feed}$, the span of the PSD of the particles in the slurry and especially in the dried precursor product increases, which is illustrated in Table 2. The data show that the D50 and span change after drying. If the D50 and span of the slurry and dry product are compared, both the D50 and span increase with higher seeding level. This is because the fines are agglomerated on the surface of coarse particles after drying, which results in D50 and span values increasing, especially at high seeding level (where there are more fines). Note that as the metal composition of the seeds and the feed is identical, the ratio $M'_{seeds}/M''_{feed}$ corresponds to the weight percentage of the seeds.

TABLE 2

Comparison of D50 and span for precursors obtained in Comparative Example 1 and Example 1, before and after drying of the slurry.

| Example | Seeding wt % | M'seeds/ M''feed | D50 in slurry (μm) | Span in slurry | D50 after drying (μm) | Span after drying |
|---|---|---|---|---|---|---|
| Comp. Ex. 1 | No | — | 22.8 | 1.28 | 22.9 | 1.28 |
| Ex. 1 | 0.5 | 0.005 | 12.5 | 1.70 | 11.7 | 1.67 |
| Ex. 1 | 1.0 | 0.01 | 7.4 | 1.54 | 8.7 | 1.75 |
| Ex. 1 | 2.0 | 0.02 | 4.8 | 1.88 | 5.9 | 4.24 |

Comparative Example 2

Figure 5:
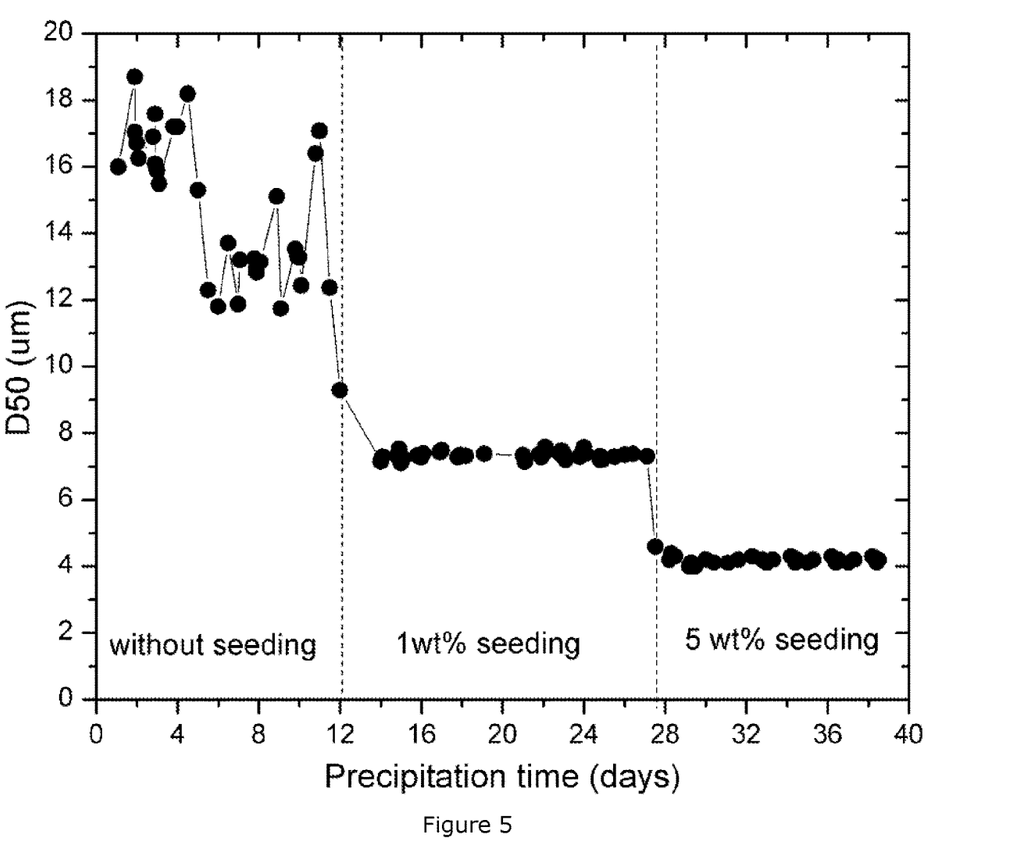
FIG. 5: The average particle size (D50) variation before (Comparative Example 2) and after 1.0 wt % and 5.0 wt % of seeding (Example 2).

Preparation of feed solution: $NiSO_4$, $MnSO_4$ and $CoSO_4$ are dissolved in deionized water and a transition metal solution is prepared, with a concentration of Ni, Mn, Co of 0.44 mol/L, 1.34 mol/L, 0.22 mol/L, resp. (Ni:Mn:Co=22:67:11). For preparing a carbonate solution $Na_2CO_3$ is dissolved in deionized water and a 1.65 mol/L $Na_2CO_3$ solution is obtained. For preparing a hydroxide solution NaOH is dissolved in deionized water and a 10 mol/L NaOH solution is obtained. The feed, hydorxide and carbonate solution are pumped into a 10 L CSTR reactor, with flow rates of $R_{feed}$=25.7 ml/min, $R_{NaOH}$=0.2 ml/min and $R_{carbonate}$=29.7 ml/min, respectively. The molar ratio of $CO_3$: Metal=1.0, and the molar ratio of $OH:CO_3$=0.04. The residence time is set at 3 hours. The feed and carbonate solution are continuously pumped into the CSTR reactor set at a precipitation temperature of 80° C., with an impeller stirring speed at 1000 rpm. The thus obtained carbonate precursor has a TD and D50 of 1.8 g/cm$^3$ and 13.4 μm, respectively. This precursor has a BET value of 11.2 m$^2$/g. But the carbonate precipitation process without seeding is unstable and the median particle size (D50) varies continuously during precipitation, which is shown in FIG. 5—left part.

Example 2

The same precipitation conditions as in Comparative Example 2 are used, but with seeding. Small seed particles (1.0 μm) are produced by ball milling the big carbonate precursor particles collected under the same precipitation conditions without seeding from a CSTR reactor (Comp. Ex. 2, hence M=M'). For preparing the seed slurry, small size $MCO_3$ particles (Ni:Mn:Co=22:67:11) are re-dispersed into water to form a homogeneous slurry under stirring with a 150 g/L solid loading level.

The feed, hydroxide and carbonate solution, and the seed slurry are pumped into the 10 L CSTR reactor, with flow rates of $R_{feed}$=25.7 ml/min, $R_{NaOH}$=0.2 ml/min and $R_{carbonate}$=29.7 ml/min, respectively. The molar ratio of $CO_3$: Metal=1.0, the molar ratio of $OH:CO_{3=0.04}$, and the molar ratio of $M'_{seeds}/M''_{feed}$ is set at 0.01 (1 wt %) and 0.05 (5 wt %) consecutively. The residence time is set at 3 hours. The solutions are continuously pumped into the CSTR reactor at a precipitation temperature of 80° C., with an impeller stirring speed at 1000 rpm.

The carbonate precursor slurry is collected through the overflow of the CSTR reactor. Then, the obtained precursor slurry is solid-liquid separated by a press filter and washed with deionized water for several times until the conductivity of the filter water is lower than 20 μS/m. The thus obtained carbonate precursor wet cake is dried in an oven at 150° C. for 24 hours. The TD, D50 and BET of the obtained carbonate precursor are compared in Table 2 as shown below.

TABLE 3

Comparison of TD, D50 and BET for precursors obtained in Comparative Example 2 and Example 2.

| Example | Seeding wt % | D50 (μm) | TD (g/cm$^3$) | BET (m$^2$/g) | Particle size tunability | Morphology |
|---|---|---|---|---|---|---|
| Comparative Example 2 | No | 13.4 | 1.8 | 11.2 | No | Spherical |
| Example 2 | 1.0 | 7.4 | 1.4 | 37 | Yes | Spherical |
| Example 2 | 5.0 | 4.2 | 1.2 | 41 | Yes | Spherical |

FIG. 5 represents in the left part the situation of Comp. Ex.2, and with seeding starting after 12 days, the precipitation process is effectively stabilized and the particle size can be finely tuned by changing the weight ratio of the seed slurry, resulting in the situation shown to the right, corresponding to the data of Example 2.

In Table 4 below, the span before and after drying is given as a function of seeding level, for a precursor product made in nearly the same conditions as the product in Example 2, referred to as Example 2. The results show the same trend as for Example 1.

TABLE 4

Comparison of D50 and span for a precursor product having the same composition as Example 2, before and after drying of the slurry.

| Example | Seeding wt % | M'seeds/ M''feed | D50 in slurry (μm) | Span in slurry | D50 after drying (μm) | Span after drying |
|---|---|---|---|---|---|---|
| Comp. Ex. 2' | No | — | 12.4 | 1.41 | 13.2 | 1.66 |
| Ex. 2' | 1.0 | 0.01 | 7.2 | 1.57 | 7.05 | 1.87 |
| Ex. 2' | 5.0 | 0.05 | 4.1 | 1.88 | 5.45 | 4.58 |

Example 3

Preparation of feed solution: $NiSO_4$, $MnSO_4$, $CoSO_4$ are dissolved in deionized water and a transition metal solution is prepared, with a concentration of Ni, Mn, Co of 1.2 mol/L, 0.4 mol/L, 0.4 mol/L, respectively (Ni:Mn:Co=60:20:20). For preparing the carbonate solution $Na_2CO_3$ is dissolved in deionized water and a 1.65 mol/L $Na_2CO_3$ solution is obtained.

The same precipitation conditions as in Example 1 are used, but with $M'_{seeds}/M''_{feed}$=0.04 and $MnCO_3$ seeding (here Mn=M'≠M). The $MnCO_3$ seeds are produced by ball milling commercially available $MnCO_3$ product to 0.5 μm and then dispersing it into water. The solid loading of the seeds slurry is 100 g/L. Before seeding, the particle size of the carbonate precursor in the reactor is continuously fluctuating and the D50 is 24.8 μm. After seeding, the median particle size in the reactor is stabilized at 7.1 μm. The carbonate precursor slurry is collected through the overflow of the CSTR reactor. Then, the obtained precursor slurry is solid-liquid separated by a press filter and washed with deionized water several times until the conductivity of the filter water is lower than 20 μS/m. The thus obtained carbonate precursor wet cake is dried in an oven at 150° C. for 24 hours.

The BET and TD of the obtained carbonate precursor are 240 $m^2$/g and 1.1 g/$cm^3$, respectively.

Example 4

Preparation of feed solution: $NiSO_4$, $MnSO_4$, $CoSO_4$ are dissolved in deionized water and a transition metal solution is prepared, with a concentration of Ni, Mn, Co of 0.67 mol/L, 0.67 mol/L, 0.67 mol/L, respectively (Ni:Mn:Co=1:1:1). For preparing the carbonate solution $Na_2CO_3$ is dissolved in deionized water and a 1.65 mol/L $Na_2CO_3$ solution is obtained. The same precipitation conditions as in Example 1 are used, but with molar ratio of $M'_{seeds}/M''_{feed}$=0.01 of $TiO_2$ seeding (here M'≠M). $TiO_2$ nano-particles (D50=250 nm) are dispersed into water to prepare a suspension with a solid loading of 50 g/L. Before seeding, the particle size of the carbonate precursor in the reactor is continuously fluctuating and the D50 is 20.1 μm. After seeding, the median particle size in the reactor is stabilized at 6.8 μm. The carbonate precursor slurry is collected through the overflow of the CSTR reactor. Then, the obtained precursor slurry is solid-liquid separated by a press filter and washed with deionized water several times until the conductivity of the filter water is lower than 20 μS/m. The thus obtained carbonate precursor wet cake is dried in an oven at 150° C. for 24 hours. The BET and TD of the obtained carbonate precursor are 93 $m^2$/g and 1.3 g/$cm^3$, respectively. The final obtained carbonate precursor has a composition of $(Ni_{0.33}Mn_{0.33}Co_{0.33}Ti_{0.01})CO_3$.

Example 5

Preparation of feed solution: $NiSO_4$, $MnSO_4$, $CoSO_4$ are dissolved in deionized water and a transition metal solution is prepared, with a concentration of Ni, Mn, Co of 1.2 mol/L, 0.4 mol/L, 0.4 mol/L, respectively (Ni:Mn:Co=60:20:20). For preparing the sodium bicarbonate solution $NaHCO_3$ is dissolved in deionized water and a 1.0 mol/L $NaHCO_3$ solution is obtained. The same precipitation conditions as in Example 1 are used, but the molar ratio of $CO_3$: Metal=2.05. Small seed particles (1.0 μm) are prepared by ball milling the big carbonate precursor particles collected under the same precipitation conditions without seeding from a CSTR reactor. For preparing the seed slurry, small size $MCO_3$ particles (Ni:Mn:Co=60:20:20) are re-dispersed into water to form a homogeneous slurry under stirring with a 100 g/L solid loading level. The molar ratio of $M'_{seeds}/M''_{feed}$ is set at 0.004 (0.4 wt %) consecutively (here M'=M). The residence time is set at 3 hours. The solutions are continuously pumped into the CSTR reactor at a precipitation temperature of 90° C., with an impeller stirring speed at 1000 rpm. Before seeding, the particle size of the carbonate precursor in the reactor is continuously fluctuating and the D50 is 10.6 μm. After seeding, the median particle size in the reactor is stabilized at 6.5 μm. The carbonate precursor slurry is collected through the overflow of the CSTR reactor. Then, the obtained precursor slurry is solid-liquid separated by a press filter and washed with deionized water several times until the conductivity of the filter water is lower than 20 μS/m. The thus obtained carbonate precursor wet cake is dried in an oven at 150° C. for 24 hours. The BET and TD of the obtained carbonate precursor are 223 $m^2$/g and 1.1 g/$cm^3$, respectively.

In the Examples above no ammonia was added in the CSTR.

The invention claimed is:

1. A method for producing a M-carbonate precursor of a Li-M oxide cathode material in a continuous process in a reactor, wherein M=$Ni_xMn_yCo_zA_n$, A being a dopant, with x>0, y>0, 0≤z≤0.35, 0≤n≤0.02 and x+y+z+n=1, the method comprising:
   introducing to the reactor a feed solution comprising Ni-, Mn-, Co- and A-ions, wherein the feed solution contains a total amount of Ni-, Mn-, Co- and A-ions £$M''_{feed}$),
   introducing to the reactor an ionic solution comprising either one or both of a carbonate and a bicarbonate solution, the ionic solution further comprising either one or both of Na- and K-ions,
   pumping a slurry comprising seeds into the reactor, the seeds comprising M'-ions, wherein the slurry contains a total amount of M' ions ($M'_{seeds}$), wherein M'=$Ni_{x'}Mn_{y'}Co_{z'}A'_{n'}$, A' being a dopant, with 0≤x'≤1, 0≤y'≤1, 0≤z'≤1, 0≤n'≤1 and x'+y'+z'+n'=1, and wherein the molar ratio $M'_{seeds}/M''_{feed}$ is between 0.001 and 0.04,
   mixing the feed solution, the ionic solution and the slurry in the reactor, thereby obtaining a reactive liquid mixture,
   precipitating a carbonate onto the seeds in the reactive liquid mixture, thereby obtaining a reacted liquid mixture and the M-carbonate precursor, and
   separating the M-carbonate precursor from the reacted liquid mixture.

2. The method according to claim 1, wherein the seeds have a median particle size D50 between 0.1 and 3 μm.

3. The method according to claim 1, wherein the M'-ions are present in a water insoluble compound that is selected from the group consisting of $M'CO_3$, $M'(OH)_2$, M'-oxide and MOOH.

4. The method according to claim 3, wherein the water insoluble compound is either $MnCO_3$ or $TiO_2$.

5. The method according to claim 1, wherein the Ni-, Mn-, Co- and A-ions are present in a water soluble sulfate compound.

6. The method according to claim 1, wherein a concentration of $NH_3$ in the reactor is less than 5.0 g/L.

7. The method according to claim 1, wherein M=M'.

8. The method according to claim 1, wherein the solid content in the slurry flow is between 30 and 300 g/L.

9. The method according to claim 1, wherein the reactor is a continuous stirred tank reactor (CSTR).

10. The method according to claim 1, further comprising the step of drying the separated M-carbonate precursor, wherein the dried M-carbonate precursor has a span defined as the value of (D90−D10)/D50 of its volumetric particle size distribution, and wherein the ratio $M'_{seeds}/M''_{feed}$ is ≤0.01, such that a span<2 of the dried M-carbonate precursor is obtained.

11. A method for producing a lithium M-oxide cathode material for a rechargeable battery, comprising:
- providing a M-carbonate precursor by the method according to claim 1,
- providing a Li precursor compound,
- mixing the M-carbonate and the Li precursor, and
- firing the mixture at a temperature between 600 and 1100° C. for at least 1 hr.

12. A method for producing a lithium M-oxide cathode material for a rechargeable battery, comprising:
- providing a M-carbonate precursor by the method according to claim 5,
- providing a Li precursor compound,
- mixing the M-carbonate and the Li precursor, and
- firing the mixture at a temperature between 600 and 1100° C. for at least 1 hr.

13. A method for producing a lithium M-oxide cathode material for a rechargeable battery, comprising:
- providing a M-carbonate precursor by the method according to claim 3,
- providing a Li precursor compound,
- mixing the M-carbonate and the Li precursor, and
- firing the mixture at a temperature between 600 and 1100° C. for at least 1 hr.

14. A method for producing a lithium M-oxide cathode material for a rechargeable battery, comprising:
- providing a M-carbonate precursor by the method according to claim 7,
- providing a Li precursor compound,
- mixing the M-carbonate and the Li precursor, and
- firing the mixture at a temperature between 600 and 1100° C. for at least 1 hr.

15. A method for producing a lithium M-oxide cathode material for a rechargeable battery, comprising:
- providing a M-carbonate precursor by the method according to claim 10,
- providing a Li precursor compound,
- mixing the M-carbonate and the Li precursor, and
- firing the mixture at a temperature between 600 and 1100° C. for at least 1 hr.

* * * * *